United States Patent [19]

Hardy

[11] Patent Number: 4,800,491
[45] Date of Patent: Jan. 24, 1989

[54] REGISTER-STACK APPARATUS

[75] Inventor: Robert M. Hardy, Scotia, N.Y.

[73] Assignee: General Electric Company, Schenectady, N.Y.

[21] Appl. No.: 931,314

[22] Filed: Nov. 17, 1986

[51] Int. Cl.[4] .......................... G06F 12/00; G11C 7/00
[52] U.S. Cl. ................................................... 364/200
[58] Field of Search ............... 364/736, 200 MS File, 364/900 MS File, 715, 748, 736; 365/219, 220, 221, 239, 240

[56] References Cited

U.S. PATENT DOCUMENTS

| | | | |
|---|---|---|---|
| 3,757,308 | 9/1973 | Fosdick | 364/200 |
| 3,984,670 | 10/1976 | Erickson et al. | 364/200 |
| 4,075,687 | 2/1978 | Nissen et al. | 364/200 |
| 4,138,732 | 2/1979 | Suzuki et al. | 364/900 |
| 4,398,244 | 8/1983 | Chu et al. | 364/200 |
| 4,488,227 | 12/1984 | Miu et al. | 364/200 |

Primary Examiner—Thomas M. Heckler
Assistant Examiner—Paul Kulik
Attorney, Agent, or Firm—Paul R. Webb, II; James C. Davis, Jr.

[57] ABSTRACT

A register-stack apparatus comprising first and second registers, first and second stack memories respectively coupled to store the register contents, first and second modifiers for providing the respective register contents in predetermined modified forms, and first and second select means for receiving a plurality of inputs including the modified register contents and, in accordance with a control command, applying a single output to the respective registers for storage therein, is disclosed. The register-stack apparatus is implemented in the controller of a computing system in which the controller receives macro-instructions from a host computer and, in response, provides microcode to an attached computing device. The register-stack apparatus is implemented as a program counter, I/O device, and plurality of register files and enables execution of CALLs, INTERRUPTs, and RETURNs with a minimal number of no-op instructions being issued to the attached computing device.

23 Claims, 10 Drawing Sheets

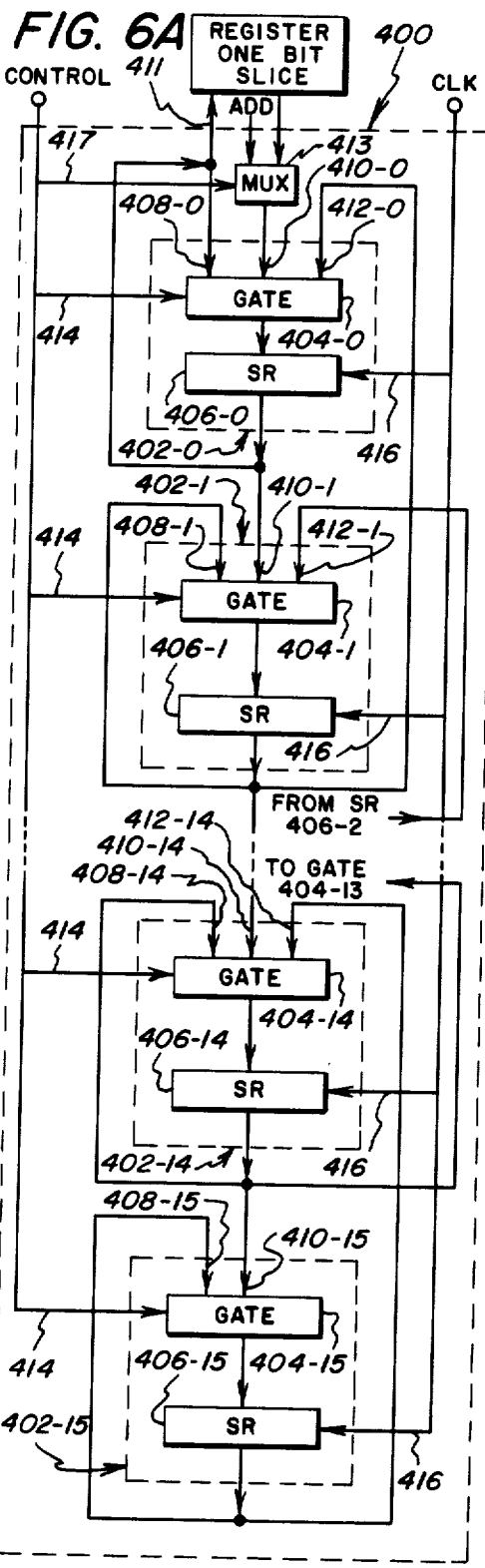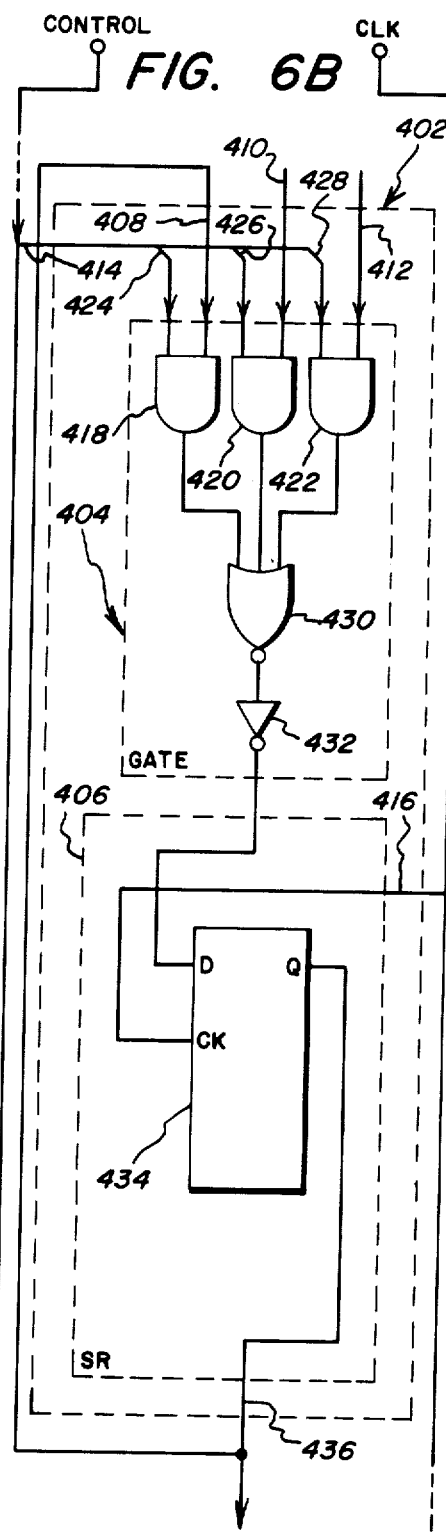

REGISTER-STACK APPARATUS

The present invention is directed in general to computing systems and, more particularly, to apparatus for increasing the operating efficiency of a computing system comprising a high speed computing device which operates on microcode instructions.

BACKGROUND OF THE INVENTION

General purpose digital computers are constructed to perform a wide variety of functions. Being so constructed, such general purpose computers may be limited in the speed with which they can perform certain specific computations. Where the specific computation is both complex and to be performed repeatedly on different sets of data, the problem of speed limitation may become significant. One solution to achieving an increase in the speed of performance is to construct a high speed computing device uniquely adapted to perform the particular computation. Typically, the high speed device receives operating instructions and data from a general purpose, host computer by way of a controller. As is well known in the art, the controller functions to process complex, high level macro-instructions issued by the host computer and provide the high speed device with a sequence of microcode instructions and data. The controller in performing this function receives the macro-instructions at a relatively slow rate and provides to the high speed device the microcode instructions at a much higher rate. In such a system, the host computer is free of the task of performing the computation performed by the high speed device and may therefore spend the available time on other tasks.

One example of a computing system as described above is one in which the high speed device comprises a parallel array of processors receiving microcode in the single instruction multiple data (SIMD) format. In such a system, the host provides high level macro-instructions to the controller at a relatively low rate, e.g., 1 MHz. The controller, in response to each macro-instruction, provides a sequence of microcode instructions which, in SIMD format, is applied to the processors in the array at a relatively high rate, e.g., 10 MHz.

A second example is a computing system having one or more special purpose (SP) processors attached to a host computer through a controller. The SP processors, which may differ from one another or be identical, are each adapted to solve a portion of a specific type of problem. The SP processors may be configured both in parallel and in series respectively according to what portions of the problem may be solved simultaneously and what portions require a result from solving a previous portion. As in the case of the parallel processor array, the controller in the attached SP processor system receives macro-instructions from the host at a relatively low rate and provides microcode to the attached processors at a higher rate, the exemplary rates noted above also being applicable to such a system.

A primary design objective in such systems is to maximize the operating efficiency of the high speed device. This operating efficiency is degraded by any inability of the controller to provide a continuous sequence of microcode instructions to the high speed device. In such cases where the controller is unable to provide a microcode instruction on any instruction cycle, the controller issues a no-op instruction, i.e. it tells the high speed device to do nothing on that cycle. Thus, operating inefficiency may be measured by the ratio of no-op's to valid microcode instructions.

Primary causes of no-op instructions in such systems are CALL and INTERRUPT instruction routines, whether originated by the host computer, the high speed device or the controller itself. In response to either a CALL or INTERRUPT, the controller, and hence the high speed device, suspends the current sequence of instructions and initiates a new sequence in its place. Before this can be accomplished, however, the contents of the controller's program counter must be saved as must the information present in the controller, i.e. state of the system, upon receipt of the INTERRUPT or CALL. The saving of this information is required so it can be recalled when a RETURN instruction is later provided, thereby enabling the controller and high speed device to return to where they left off in the interrupted instruction sequence. This saving of information and its later recall require multiple instruction cycles for which no-op instructions must be issued to the high speed device.

The program counter is typically a discrete device in the controller and one or more instruction cycles are required to save its current value by pushing it onto stack memory or transferring it to random access memory (RAM). Subsequently, additional instruction cycles are required to transfer the computational results representative of the system state, at the time of interrupt, to available RAM. The RETURN instruction routine requires further instruction cycles to perform these functions in reverse. As stated above, no-op's must be provided to the high speed device during these instruction cycles. As a result, system operating efficiency is significantly degraded.

It is further noted that in order to perform the functions described above, the controller includes a plurality of different devices to serve different functions, e.g. a program counter, memory space, and a memory controller. Provision of this many different devices serves to increase the cost of the controller. Further, since the devices are physically different, it is more difficult to perform parallel operations with them. Examples of different devices to serve some of the above described functions are the Ser. No. 74890 sequencer and the Ser. No. 74888 register-ALU slice, both provided by the Texas Instruments Company.

It, therefore is an object of the present invention to provide a device, for use in a computing system, which enables minimization of the number of instruction cycles to save the program counter and system state.

SUMMARY OF THE INVENTION

In accordance with the present invention, there is provided apparatus, for use in a computing system, comprising a first memory means for retrievably storing a plurality of binary bit signals, a second memory means for storing signals such that the last signal stored therein is the first available for retrieval, the second memory means being coupled to receive for storage the contents of the first memory means. The apparatus further includes modifier means for providing the contents of the first memory means in a plurality of predetermined modified forms and select means, responsive to an externally generated control command, for applying to the first memory means selected signals for storage therein. The select means is coupled to receive the plurality of predetermined modified forms of the first memory means contents. The apparatus additionally includes output means for applying the content of the first memory means to one of a plurality of ports for reading the first memory means contents external to the apparatus.

In an illustrated embodiment, the apparatus of the present invention comprises register-stack apparatus including two substantially identical configurations of devices, each configuration having a register, a stack memory coupled to the register, a modifier device for providing the register contents in a plurality of modified forms and a register-in-select device for receiving a plurality of inputs including the modifier outputs and applying a single output to the register, for storage therein, in accordance with a control command signal. The two registers are coupled to a set of data ports through a port-out-select device. The status of the contents of either register can be read on a status port. The register-stack apparatus is illustrated as implemented in a controller of an exemplary computing system wherein the controller receives macro-instructions from a host computer bus and provides microcode instructions to an attached computing device. The register-stack apparatus is implemented as a program counter, as an input/output device and as a plurality of register file devices. In operation, the register-stack apparatus enables minimization of the number of instruction cycles to store and later recall the program counter and system state in response to CALLs, INTERRUPTs and RETURNs. The number of no-op instructions provided to the attached device is thereby minimized and system operating efficiency enhanced.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

FIGS. 6A, 6B and 6C are schematic illustrations of a stack memory constructed in accordance with the present invention.

DESCRIPTION OF THE INVENTION

Figure 1:
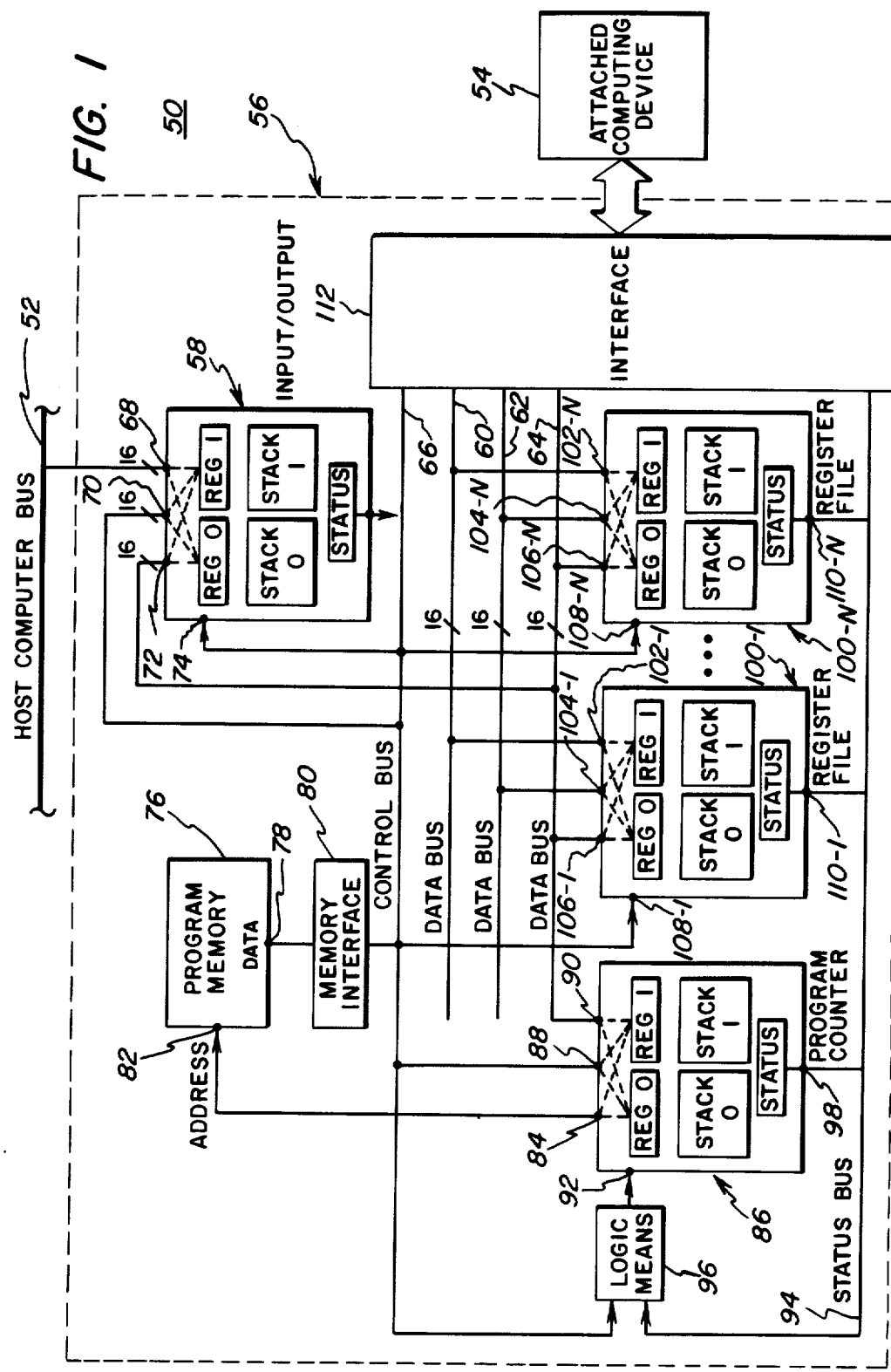
FIG. 1 illustrates a computing system in which the register-stack apparatus of the present invention is implemented.

Referring now to the drawings, FIG. 1 illustrates a computing system 50 wherein the register-stack apparatus of the present invention is implemented as an input/output (I/O) device 58, a program counter 86 and a plurality of register file devices 100. System 50 includes a host computer bus 52 on which communication with a host computer (not shown) takes place. System 50 further includes an attached computing device 54 and a controller 56 for receiving macro-instructions from the host computer and for each such macro-instruction, providing a plurality of microcode instructions to computing device 54. Computing device 54 may comprise a parallel array of processors or plurality of special purpose processors, as described above.

Controller 56 comprises I/O device 58, constructed from the register-stack apparatus of the present invention, for transferring information between host bus 52 and other devices in the controller. To this end, controller 56 further comprises three bi-directional data buses 60, 62 and 64 and a control bus 66. In the preferred embodiment of the present invention, each data bus is sixteen bits wide. The control bus has a bit width suited to the control requirements of computing device 54 as well as devices internal to the controller. I/O device 58 includes a 16-bit data port 68 connected to host bus 52 and two 16-bit data ports 70 and 72 respectively connected to data bus 64 and control bus 66. The I/O device further includes a control port 74 connected to the control bus.

Controller 56 further comprises a program memory device 76 for storing microcode instructions. A data port 78 of program memory 76 is coupled to control bus 66 through a memory interface device 80. Memory interface 80 is adapted to facilitate both writing into and reading from memory 76, via control bus 66, so that word size may be varied for each operation. For example, and without limitation, where each microcode word consists of a plurality of 16-bit words, the interface enables writing the microcode word into the memory by a plurality of separate 16-bit word write operations. During operation, when operating speed is essential, the interface enables reading each entire microcode word from the memory in a single read operation. Program memory 76 further includes an address port 82 coupled to a data port 84 of program counter 86 to receive a sequence of memory addresses of microcode instructions.

Program counter 86, constructed from the register-stack apparatus of the present invention, includes data ports 88 and 90 respectively connected to the control bus and data bus 64. The program counter further includes a control port 92 coupled both to control bus 66 and a status bus 94 through logic means 96. Logic means 96 can include any logic for modifying, in accordance with information on the status bus, a control signal received from the control bus and intended for control port 92. The logic means thereby enables modification of the program counter value in accordance with a status condition elsewhere in the controller. The program counter additionally includes a status port 98 connected to status bus 94.

Controller 56 additionally comprises a plurality of identical register file devices 100-1 through 100-N, where the actual number of register files provided depends on the nature of computing device 54. Each register file 100-i, constructed from the register-stack apparatus of the present invention, includes three data portions 102-i, 104-i and 106-i respectively connected to data buses 60, 62 and 64 and one control port 108-i connected to the control bus, where i=1, 2, ..., N. Each register file further includes a status port 110-i connected to status bus 94.

Controller 56 also includes an interface device 112 for connecting to computing device 54. Interface 112 is adapted to, among other things, perform calculations required in generating microcode for the computing device. The interface therefore includes components the nature of which is determined in accordance with the nature and complexity of computing device 54. For example, the interface may include random access memory (RAM) and one or more arithmetic logic units (ALU), such additional components becoming necessary as computing device 54 becomes more complex, as is the case where it comprises a parallel processing array. The nature of the structure of interface 112, which is well known in the art, is not the subject of the present invention and is therefore not described in detail herein.

As indicated above, I/O device 58, program counter 86 and register files 100-1, . . . , 100-N are each constructed from the register-stack apparatus of the present invention. This being the case, the internal structure of each of these devices is shown in FIG. 1 as being identical. The illustrated internal structure is diagrammatic only, nominally consisting of two register (REG), numbered 0 and 1 and two stack memories also numbered 0 and 1 respectively connected to registers 0 and 1. Each register is connectible, as indicated by dashed lines, to any of the three data ports of the register-stack apparatus.

Figure 2:
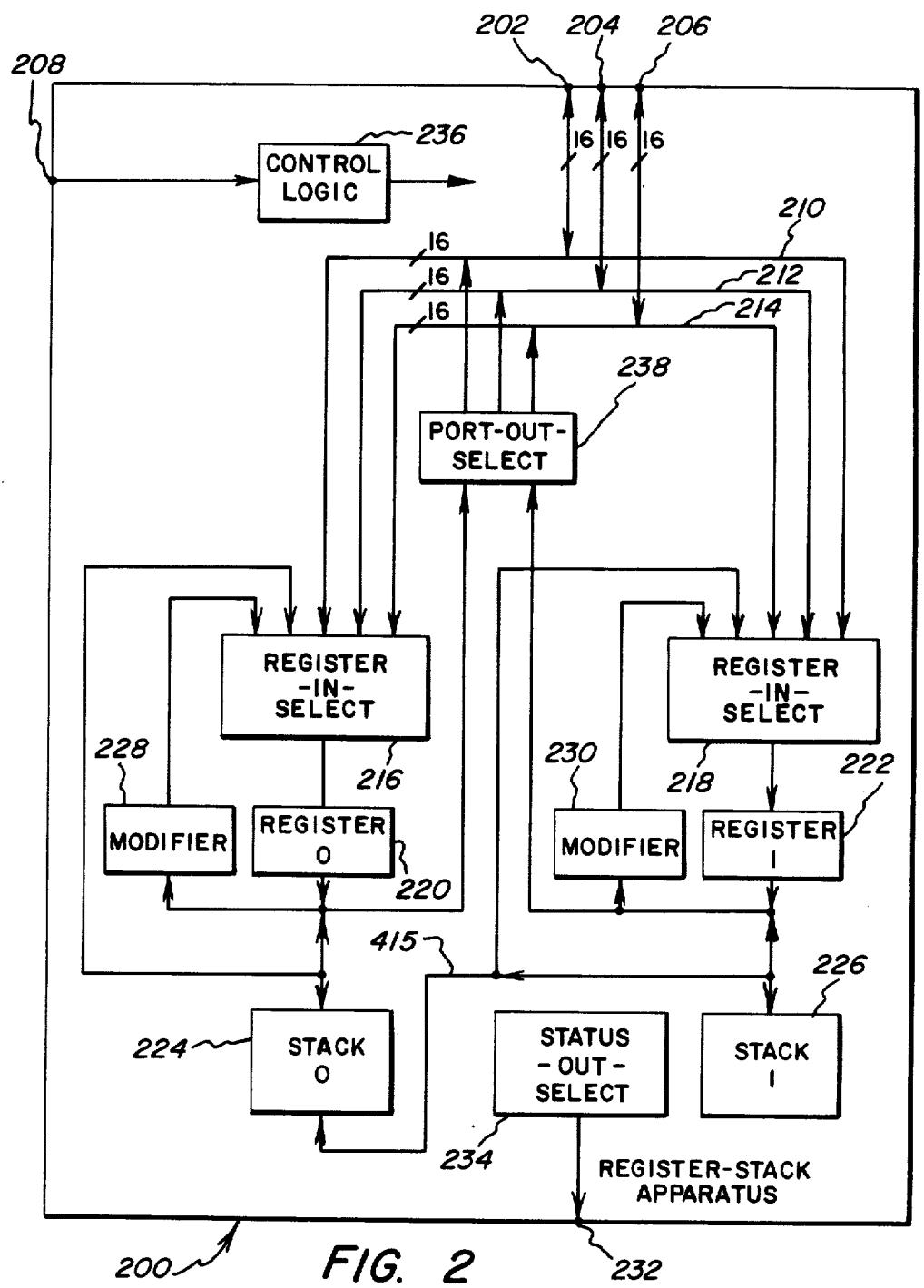
FIG. 2 is an illustrative block diagram of the register-stack apparatus of the present invention.

FIG. 2 illustrates in greater detail the internal structure of a register-stack apparatus 200 which may be used in any of the functions discussed above, i.e. I/O device 58, program counter 86 and register file 100. Register-stack 200 has three, 16-bit wide data ports 202, 204 and 206 and a control port 208. As more fully described below, each data port is a tri-state port, being capable of assuming either a driver state or a high impedance (hi-z), non-receiver state. Data ports 202, 204 and 206 are respectively connected to internal, bi-directional data buses 210, 212 and 214, each internal data bus being 16 bits wide. Each internal data bus is connected to two identical register-in-select (R-I-S) devices 216 and 218. R-I-S's 216 and 218 have outputs respectively connected to a register 0 and register 1 respectively designated 220 and 222. Each R-I-S is coupled to receive a plurality of data and control inputs and provide an output signal, in accordance with the inputs received thereby, that determines the state of the register connected thereto. Each register is nominally 16 bit positions wide and further includes an underflow bit position and an overflow bit position, so that each register is actually 18 bit positions wide. The contents of registers 220 and 222 are available on outputs respectively connected to a stack 0 (224) and stack 1 (226). Each stack is 19 bit positions wide consisting of 18 bit positions to receive the register contents including the underflow and overflow bit positions, and one bit position for tracking the full/empty status of the register, in the manner more fully described below. It is preferred herein that each stack be of the last in, first out (LIFO) type and be sixteen words deep.

The contents of registers 220 and 222 are also respectively available to modifier devices 228 and 230. Each modifier device includes logic enabling it to add '1' to or subtract '1' from the register contents, to provide the complement of the register contents, or to "hold" the register contents unchanged. Each modifier 228 and 230 has an output, on which it provides the results of its operation (add, subtract, etc), applied to R-I-S 216 and 218, respectively.

Apparatus 200 further includes a tri-state status port 232 to which is connected to a status-out-select (S-O-S) device 234. The status of either register 220, 222 or either stack 224, 226 can be read on port 232, in a manner more fully described below.

A control logic device 236 is coupled to control port 208 to receive external control signals effective to control the operation of apparatus 200. Control logic 236 comprises a decoder and is adapted to provide, in response to the external control signals, internal control command signals (by means of connections not shown in FIG. 2) to the devices included in apparatus 200 except modifier devices 228 and 230.

A port-out-select device 238 receives the contents of registers 220 and 222 and is responsive to an internal control command signal from control logic 236 to read the contents of either register onto any one of the three internal data buses. Device 238 may simply comprise one or more multiplexers to accomplish this function.

Figure 3:
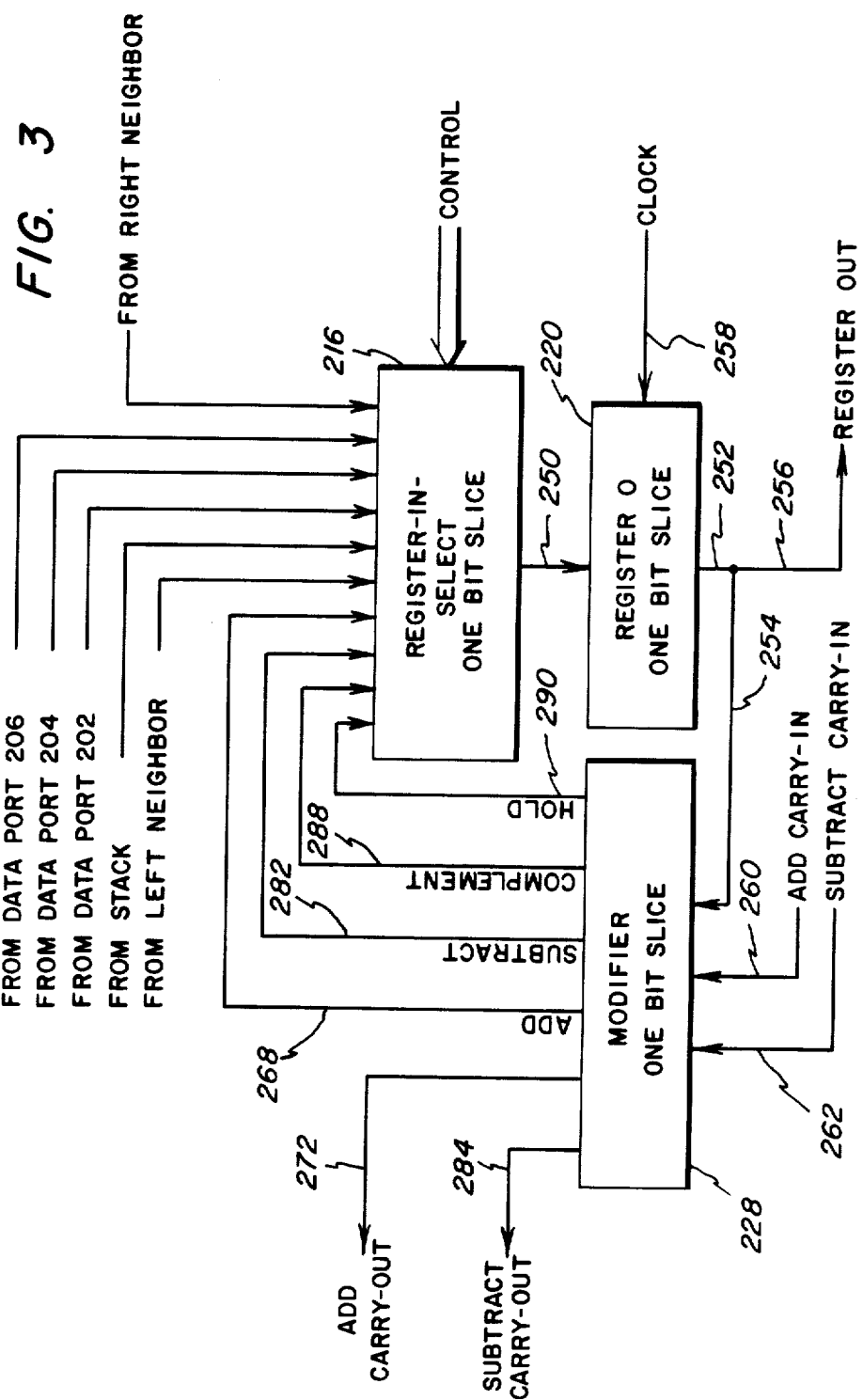
FIG. 3 is an illustrative block diagram of a one-bit slice of a portion of the register-stack apparatus of the present invention.
Figure 4A:
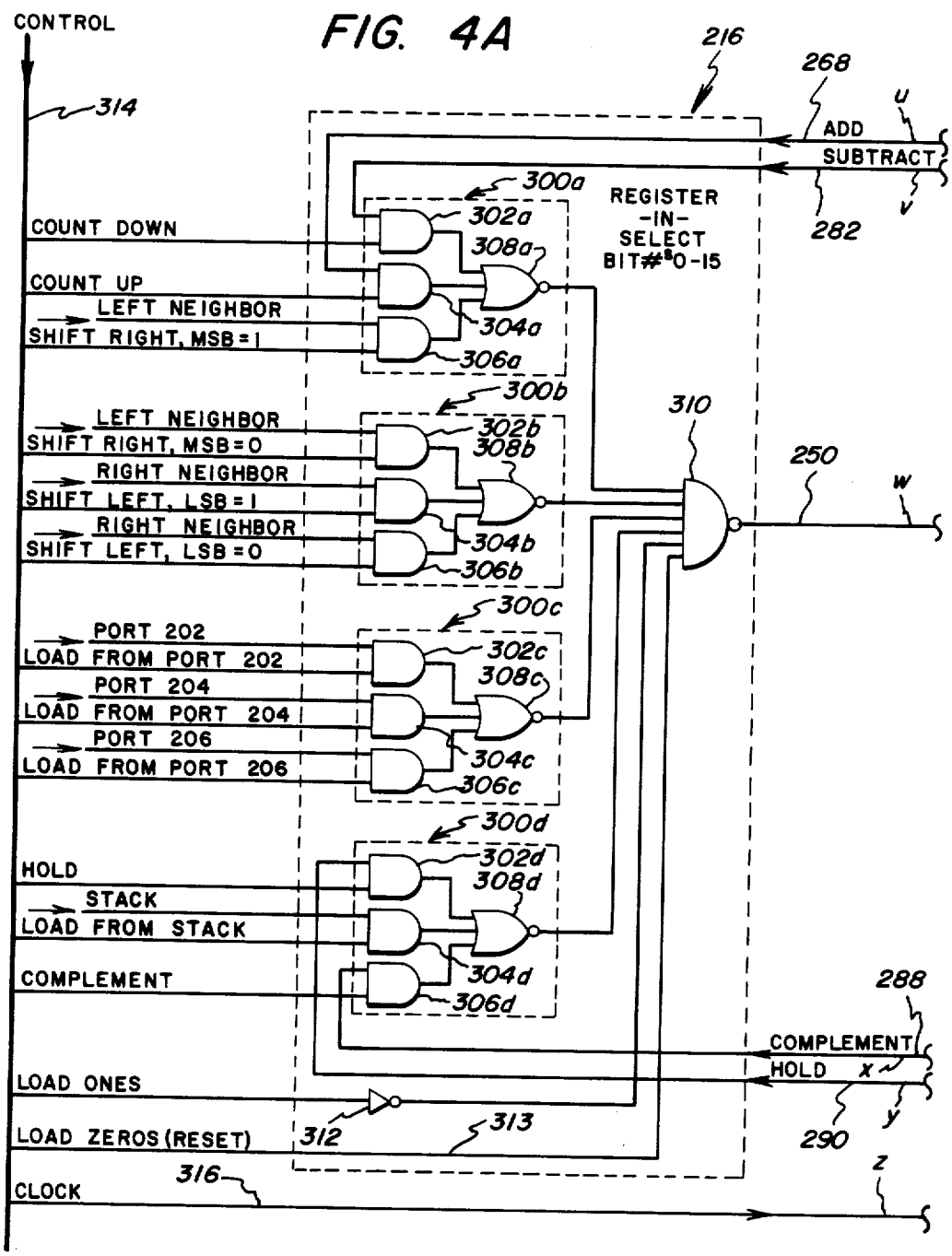
FIGS. 4A and 4B are schematic illustrations of the one-bit slice illustrated in FIG. 3.
Figure 4B:
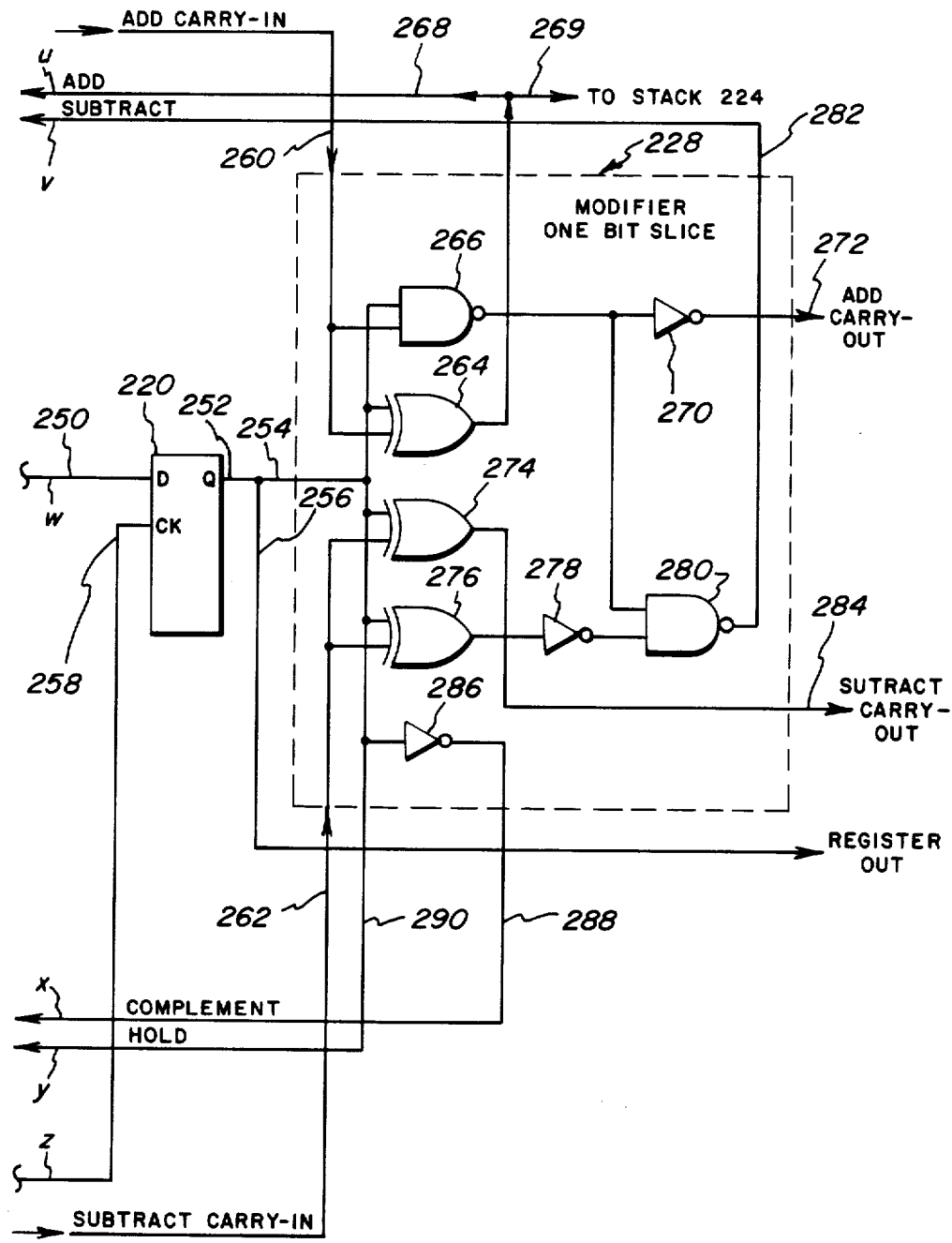

FIG. 3 is a block diagram illustration of a one-bit slice of register 220, modifier 228 and R-I-S 216. FIGS. 4A and 4B also illustrate the same one-bit slice but further show the logic components included in each device as well as the control connections thereto. With respect to both of these Figures, the one-bit slice illustrated is other than the overflow or underflow bits of the register. A one-bit slice of register 222, modifier 230 and R-I-S 218 is identical to that illustrated in FIGS. 3, 4A and 4B. As seen in FIG. 3, the one-bit slice of register 220 receives a single input 250 from R-I-S 216 and provides a register output 252. One branch 254 of the output is applied to the one-bit slice of modifier 228. The register output is brought out of the bit slice, as diagrammatically shown by a second branch 256, and used for connection to the two one-bit slices immediately adjacent the illustrated bit slice, on either side thereof, as well as for reading the content of the register one-bit slice. The register one-bit slice also receives a control input signal in the form of a clock input 258. Register 220 may comprise a plurality of bistable devices such as D-flip flops. Thus, in FIG. 4B, the one-bit slice of the register is indicated as a D-flip flop.

Register 220 (as well as register 222) is preferably constructed from eighteen one-bit slices including an underflow slice and an overflow slice. The bit slices between the underflow and overflow slices are for reference numbered 0 to 15, with slice #0 holding the least significant bit (LSB) and slice #15 holding the most significant bit (MSB). The overflow slice is adjacent slice #15 and the underflow slice is adjacent slice #0. For convenience, left and right terminology, known in the art, is used hereinbelow to respectively refer to the higher numbered end and the lower numbered end of the register.

Modifier 228 receives register output branch 254 and is further coupled to receive an add carry-in input 260 and a subtract carry-in input 262 from the modifier of the one-bit slice to the immediate right. Referring also to FIG. 4B, register output branch 254 and add carry-in 260 are both applied to an exclusive-OR gate 264 and a NAND gate 266. The output of gate 264 is an addition result provided as an output 268 of the modifier. A branch 269 of the addition result is provided for application to stack 224 for a purpose more fully described below. The output of NAND gate 266 is applied to an inverter 270 the output of which is an add carry-out output 272 of the modifier. The add carry-out output is used as the add carry-in input for the one-bit slice to the left in the register. Branch 254 and subtract carry-in 262 are both applied to two exclusive-OR gates 274 and 276. The output of gate 276 is applied to an inverter 278 the output of which is supplied to a NAND gate 280 along with the output of gate 266. The output of gate 280 is a subtraction result provided as an output 282 of the modifier. The output of gate 274 is a subtraction carry-out result provided as an output 284 of the modifier. The subtract carry-out like the add carry-out serves as the carry-in for the one-bit slice to the left.

Register output branch 254 is applied to an inverter 286 to obtain the complement of the bit contained in the register one-bit slice, the complement being provided as a "complement" output 288 of the modifier. Branch 254 is also brought out, unmodified, from the modifier on a "hold" output 290.

Modifier outputs 268, 282, 288 and 290 are applied to R-I-S 216, the modifier output reference numerals being indicated, for clarity, where applied to the R-I-S in FIG. 4A. The illustrated modifier one-bit slice corresponds to any one of the bit #'s 0 through 15, there being no modifier slices corresponding to the overflow and underflow bit positions of the R-I-S and register.

The one-bit slices of R-I-S 216 and register 220 shown in FIGS. 4A and 4B correspond to bit #'s 0 through 15. The one-bit slices corresponding to the overflow and underflow bits are described and illustrated below. R-I-S 216 comprises four identical combinational logic devices 300, the four devices in the R-I-S being designated 300a, 300b, 300c and 300d. Each device includes three AND gates 302, 304 and 306, the respective outputs of which are applied to a NOR gate 308. The AND gates each have two inputs. The reference numerals for gates 302, 304, 306 and 308 each include an a, b, c or d suffix depending on which of the four devices 300 the gates are located in. The outputs of devices 300 are applied to a NAND gate 310. R-I-S 216 also includes an inverter 312 the output of which is applied to the NAND gate. The output of NAND gate 310 is applied as an input 250 to the register 220 one-bit slice.

Each R-I-S and register one-bit slice is connected to a control bus 314 which is coupled to receive internal control command signals from control logic 236. Each one-bit slice of R-I-S 216 and register 220 receives the same control signals from the control logic. One bit position on the control bus is allocated to each of the different possible control commands that may be applied to the register via the R-I-S. Thus, each AND gate in the R-I-S has one of its two inputs, hereinafter referred to as the control input, connected to receive a control signal bit from the control bus, inverter 312 also being connected to receive a control signal bit. A "load zeros" control input 313, connected to receive a control bit from control bus 314, is also connected to NAND gate 310. The second input of each AND gate, hereinafter referred to as the data input, is connected to receive the data corresponding to the signal applied to the control input. For example, and as more fully described below, the control signal bit applied to the AND gate 302c control input corresponds to a command to load register 220 from data port 202. The data input to gate 302c is therefore one bit of the signal present on port 202. In general, the control signal bit is '1' and, with respect to the control signal applied to bus 314, no more than one of the control inputs to R-I-S 216 has the '1' bit applied to it. This is necessary since no more than one command can be executed at one time by the R-I-S and register.

In the case where the outputs of all but one AND gate 302, 304 and 306 are '0', the outputs of all but one NOR gate 308 are '1'. Further, if it is assumed the control inputs to inverter 312 and control input 313 are '0's, then the inputs to NAND gate 310 consists of five '1's and one '0'. The NAND gate therefore applies a '1' to register input 250. Thus if a single AND gate output is '1', or if the control input to inverter 312 is '1', the NAND gate applies a '1' to the register input. If all AND gate outputs are '0', a '0' also being applied to inverter 312, but a '1' is applied to control input 313, the NAND gate applies a '0' to the register input. Thus, the logic in R-I-S 216 operates to convey the appropriate result to the register one-bit slice. A clock signal derived from a clock signal output 316 of the control bus and applied to register clock input 258 results in storage in the register of the appropriate result.

The control inputs connected to AND gates 302a, 304a and 306a respectively correspond to the commands "count down", "count up" and "shift register to right, setting MSB=1". The "count down" command causes '1' to be subtracted from the content of register 220 and so, subtract output 282 of the modifier is applied to the data input of gate 302a. "Count up" causes addition of '1' to the register content and so the add output of the modifier is applied to the gate 304a data input. The "shift right" command requires the bits in register 220 to be shifted one position to the right. Therefore, the data input for each one bit slice must be the content of the neighboring register one bit slice on the immediate left. The "shift right" command causes the content of the bit #0 slice to shift into the underflow slice. Also, since the command stipulates that upon shifting right, MSB=1, the data input of gate 306a in bit slice #15 is connected to a logic '1' voltage potential.

The control inputs to AND gates 302b, 304b and 306b of device 300 respectively correspond to the control commands "shift register to right, setting MSB=0"; "shift register to left, setting LSB=1"; and "shift register to left, setting LSB=0". As discussed above, the shift right command requires the data input for each one-bit slice to be the content of the neighboring register one-bit slice on the immediate left. Since the control command applied to AND gate 302b also stipulates setting MSB=0, the data input to this gate in bit slice #15 is connected to a logic '0' voltage potential. The "shift left" command applied to either gates 304b or 306b requires the data input for each one-bit slice to be the content of the neighboring register one-bit slice on the immediate right. Where the command stipulates that LSB='1' or '0', the data input of gate 304b or 306b in bit slice #0 is respectively connected to a logic '1' or '0' voltage potential. The shift left command also causes the content of the bit #15 slice to shift into the overflow slice.

The control inputs to AND gates 302c, 304c and 306c respectively correspond to commands to load from data ports 202, 204 and 206. Thus, the data inputs of AND gates 302c, 304c and 306c are connected to busses 210, 212 and 214 for access to the appropriate data ports.

The control inputs to AND gates 302d, 304d and 306d respectively correspond to commands to "hold" the register contents unchanged, "load from stack" (i.e., stack 224) and "complement" the register contents. "Hold" output 290 of the modifier is applied to the data input of AND gate 302d. The "load from stack" command is also known in the art as a "pop" operation. The data input to AND gate 304d is connected to receive the bit contained in the corresponding one-bit slice of the top position in stack 224. "Complement" output 288 of the modifier is applied to the data input of AND gate 306d.

The control input connected to inverter 312 corresponds to the command "load ones" into the register. Thus, a control signal bit '1' applied to the inverter results in a '1' being loaded into the register one-bit slice. Control input 313 corresponds to the command "load zeros" into the register. A control signal bit '1' applied to control input 313 results in '0' being loaded into the register one-bit slice. The "load zeros" command is therefore effective to reset the register.

Figure 5A:
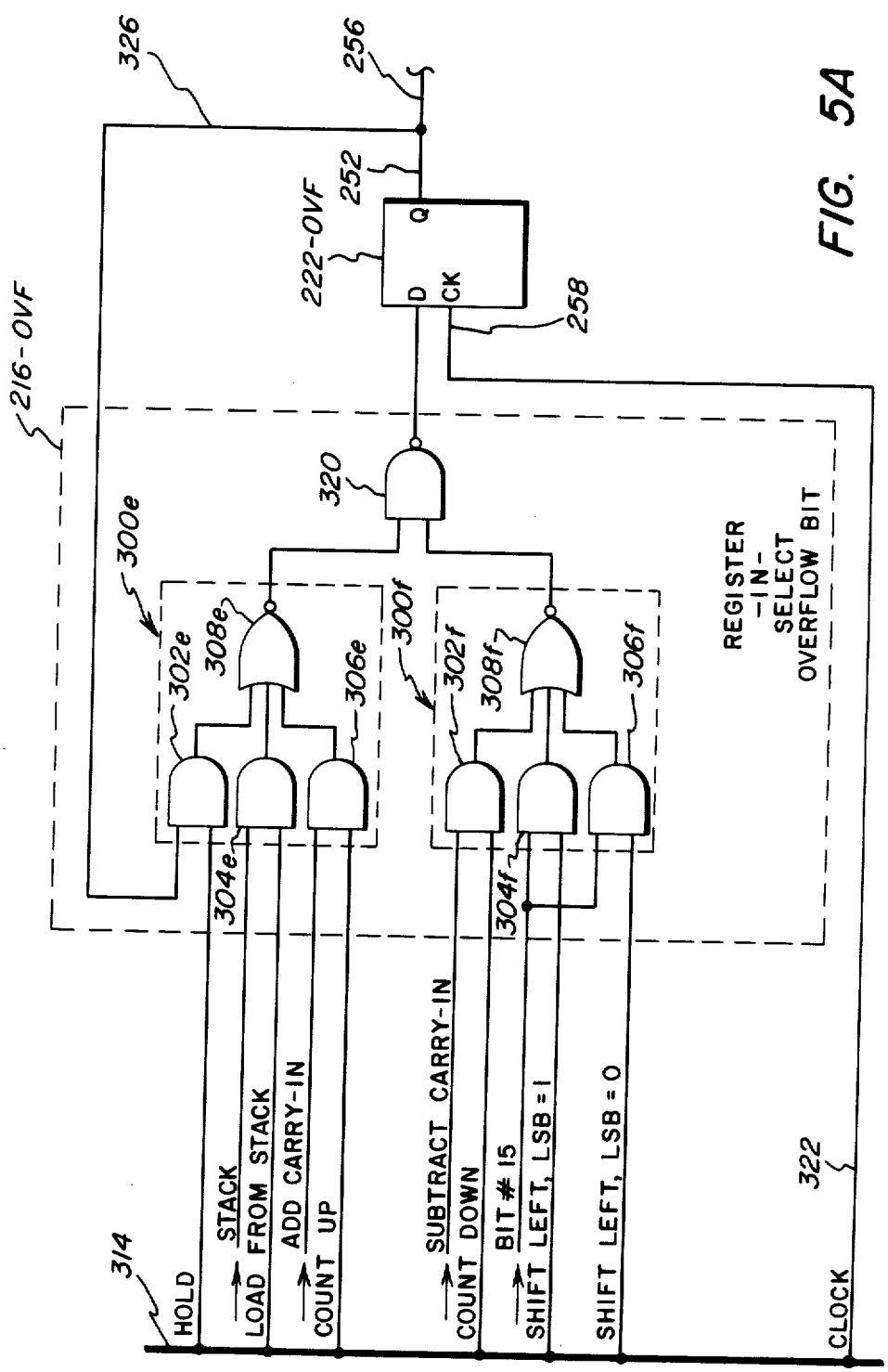
FIGS. 5A and 5B are, respectively, schematic illustrations of an overflow and an underflow one-bit slice of a portion of the register-stack apparatus of the present invention.
Figure 5B:
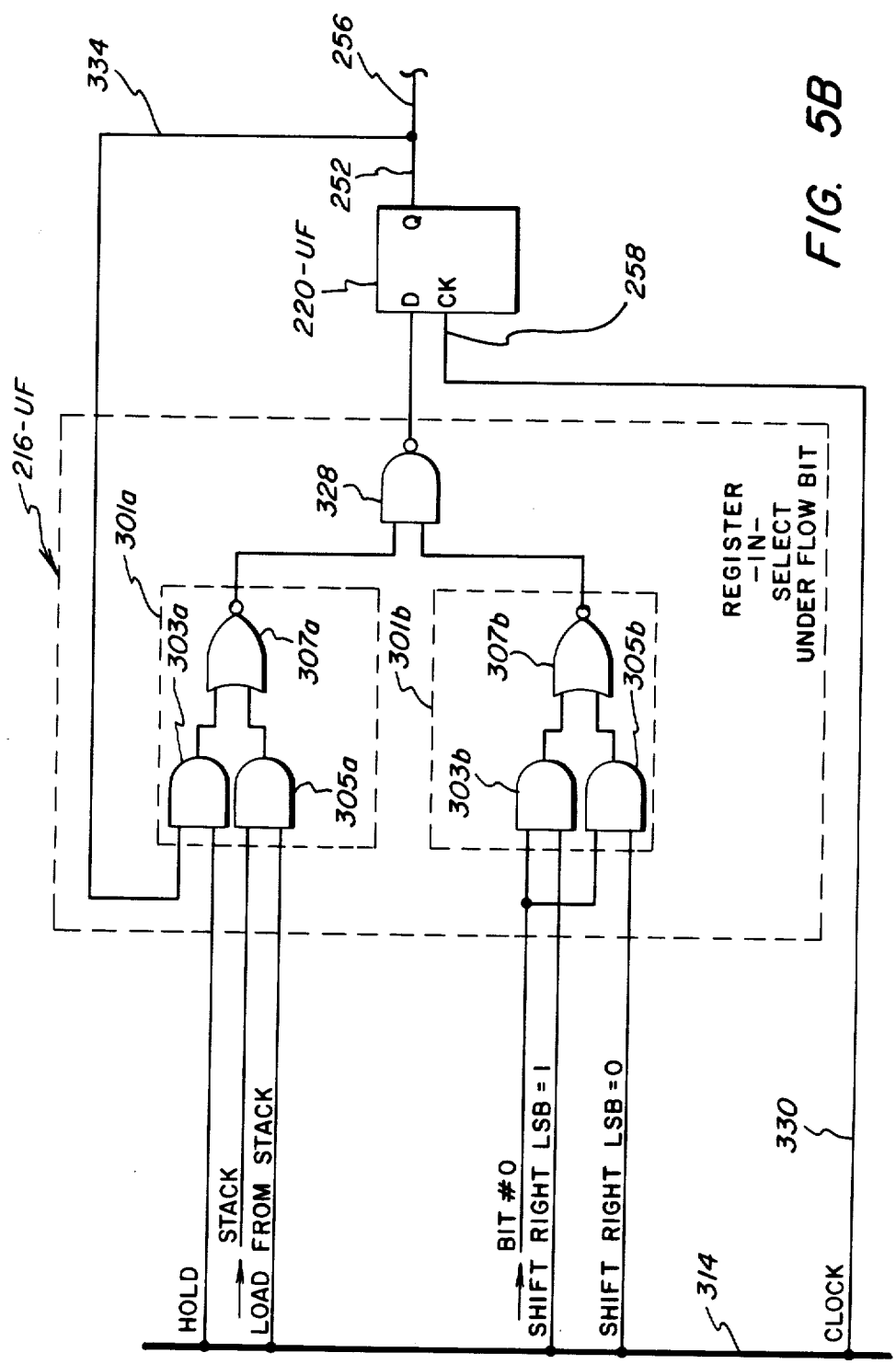

FIGS. 5A and 5B respectively illustrate one-bit slices of the overflow and underflow bit positions of R-I-S 216 and register 220. Referring to FIG. 5A wherein the R-I-S and register one-bit slices are respectively designated 216-OVF and 220-OVF, the R-I-S comprises two logic devices 300 each configured as described above with respect to FIG. 4A and designated 300e and 300f. Each device 300 includes AND gates 302, 304 and 306 and a NOR gate 308, the reference numerals each including a letter suffix corresponding to its respective device 300. The outputs of devices 300 are applied to a NAND gate 320, the output of which is applied to the 'D' input of the D-flip flop of register one-bit slice 220-OVF. A clock signal output 322 is also derived from control bus 314 and applied to the CK input of the flip flop to enable its loading.

The control inputs connected to AND gates 302e, 304e and 306e respectively correspond to the commands "hold", "load from stack" (i.e. pop), and "count up", the nature of each of these commands having been previously discussed. A tap connection 326 from output 252 of the flip flop is applied as the data input to AND gate 302e, as is appropriate for the "hold" command. The data input to AND gate 304e is connected to the top position of the corresponding one-bit slice in stack 224 to enable loading therefrom. The add carry-in input applied to AND gate 306e is derived directly from the add carry-out output of the modifier one-bit slice of bit #15.

The control inputs to AND gates 302f, 304f and 306f respectively correspond to the commands "count down", "shift register to left, setting LSB=1" and "shift register to left, setting LSB=0". The subtract carry-in input applied to AND gate 302f derives from the subtract carry-out output of the bit #15 modifier. For the "shift left" command, irrespective of whether LSB is set equal to '1' or '0', the overflow slice receives the content of the bit #15 register slice. Thus, AND gates 304f and 306f have the content of that register slice applied thereto.

Referring to FIG. 5B, wherein the R-I-S and register one-bit slices are respectively designated 216-UF and 220-UF, the R-I-S comprises two logic devices 301a and 301b each having two AND gates 303 and 305, the outputs of the AND gates being applied to a NOR gate 307. The device 301 outputs are applied to a NAND gate 328, the output of which is applied to the D-flip flop of register one-bit slice 220-UF. A control bus clock signal output 330 is applied to the flip flop as described above with respect to the overflow slice.

The control inputs to AND gates 303a and 305a respectively correspond to the commands "hold" and "load" from stack" (i.e. pop). The underflow slice is not connected to receive the "count up" command since there is no add carry-in to the underflow slice. In order to execute the "hold" command, the data input to AND gate 303a is connected to a tap 334 from the flip-flop output. The data input to AND gate 305a is connected to the top position of stack 224 to enable loading therefrom.

The underflow slice is not connected to receive the "count down" command, there being no position to the right of the underflow slice and hence no subtract carry-in. AND gates 303b and 305b are connected to receive the control commands "shift register to right, setting LSB=1" and shift register to right, setting LSB=0". Irrespective of the value to which the LSB is to be set, the underflow slice receives the content of the bit #0 register slice, this being indicated in FIG. 5B.

Stacks 224 and 226 are described next. As discussed above, each stack 224, 226 is nineteen bit positions wide. Eighteen of the bit positions are aligned with bits #0 to #15, as well as the underflow and overflow bits of the register with which the stack is associated. A nineteenth indicator bit position of the stack, described more fully below, is provided to indicate the stack full/empty status. Each stack is sixteen words deep, i.e. each bit position of the stack is sixteen bits deep.

One bit position 400 of either stacks 224 or 226 illustrated in FIG. 6A is exemplary of any one of the eighteen bit positions exclusive of the indicator bit position. Position 400 includes sixteen position units 402-0, 402-1 . . . , 402-14 and 402-15. Each position unit 402 consists of a gate device 404, the output of which is connected to a one bit shift register (SR) 406, each of these devices being designated in FIG. 6A with a reference numeral including a suffix corresponding to that of its respective position unit 402. Generally each gate 404 has three inputs 408, 410 and 412 to which are respectively applied the bit contained in its own unit shift register, the bit contained in the shift register of the unit immediately above, and the bit contained in the shift register of the unit immediately below. For example, inputs 408-1, 410-1 and 412-1 of gate 404-1 have respectively applied thereto the bits contained in shift registers 406-1, 406-0 and 406-2. The connections to gate inputs 408, 410 and 412 are shown in FIG. 6A. Descriptive terms used herein with respect to the stack implying a vertical orientation, e.g. such as "above" and "below", as is known in the art, are only used to facilitate description of the stack and are not intended to imply any true physical orientation thereof.

Each position 400 includes a multiplexer (MUX) 413 to which is applied the content of the corresponding register one-bit slice and the addition result (indicated as "ADD" in FIG. 6A) of the corresponding modifier one-bit slice. For example, in the case of stack 224, branch 269 carrying the addition result from modifier 228 would be applied as the "ADD" input to the multiplexer. The output of multiplexer 413 is applied to gate input 410-0, the multiplexer also being connected to receive a control input 417. The content of each shift register 406-0 in the stack is available to the register 220 or 222 with which the stack is associated, by a connection 411. Unit 402-15 has no unit below it and so has nothing applied to its gate input 412-15. Note however that in a preferred embodiment of the present invention, in response to a predetermined control command, stack 224 is extended into stack 226 by connecting the top of stack 226 to the bottom of stack 224. When the stack extension connection is effected, gate inputs 410-0 of the bit positions of stack 226 are connected to the outputs of the corresponding shift registers 406-15 of stack 224 and not to the output of register 222. Further, the outputs of shift registers 406-0 of stack 226 are, only in the extended stack case, connected to the gate inputs 412-15 of the corresponding bit positions of stack 224. A connection 415 for effecting the extended stack is only diagrammatically shown in FIG. 2.

Each gate 404 has applied thereto a control input 414 while each shift register 406 receives a clock signal input 416. Referring also to FIG. 6B in which one position unit 402 is illustrated in greater detail, gate 404 comprises three AND gates 418, 420 and 422 each having a first input respectively connected to gate inputs 408, 410 and 412. Control input 414 consists of three control signal inputs 424, 426 and 428 respectively applied to a second input of AND gates 418, 420 and 422. The outputs of the AND gates are applied to a NOR gate 430, the output of which is applied to an inverter 432. It is preferred herein that shift register 406 be provided as a D-flip flop 434 connected to receive the inverter 432 output on its D input. The clock input (CK) of the flip flop is connected to clock signal input 416. The flip flop output (Q) is a shift register output 436 shown connected to gate input 408 and available for connection to gate inputs 410 and 412 of the units 402 respectively immediately below and above (not shown in FIG. 6B).

The control commands that may be applied to control signal inputs 424, 426 and 428 are "hold", "push register onto stack" and "load register from stack" (i.e. pop the stack). A control command "push register+1 onto stack" can also be applied to the stack as described below. The content of the shift registers respectively connected to AND gate inputs 408, 410 and 412 are continuously available at those inputs. Therefore, application of a control input signal of '1' to a particular one of the AND gates, in effect enables the appropriate shift register content to appear on the output of that AND gate. Where a clock signal is applied to clock input 416 simultaneously with application of the control signal, the output of inverter 432 is shifted into shift register 406. Thus, supplying the control signal to control input 424 causes the content of the shift register to be loaded into itself, i.e. the "hold" command. This "hold" command corresponds to the "hold" command discussed above with respect to registers 220 and 222.

Applying the control signal to control input 426 of each gate in the stack causes the content of each shift register in the stack to be loaded into the shift register of the position unit immediately therebelow. As a result, the stack is pushed down. The control signal applied to control input 417 of the multiplexer determines whether the content of the corresponding register one-bit slice ("push register onto stack" command) or the addition result from the corresponding modifier ("push register+1 onto stack" command) is loaded into shift register 406-0.

Applying the control signal to control input 428 of each gate in the stack causes each shift register in the stack to be loaded into the shift register of the position unit immediately thereabove. If the "load from stack" command is applied to the appropriate register 220 or 222, as discussed above, simultaneously with the control signal to gate control input 428, the content of each shift register 406-0 is loaded into its corresponding register one-bit slice. As discussed above, this operation is known in the art as popping the stack. Note that a control signal is applied to only one of the three control signal inputs 424, 426, 428 at any one time, the same control signal being simultaneously applied to all gates 404 in the stack.

Figure 6C:
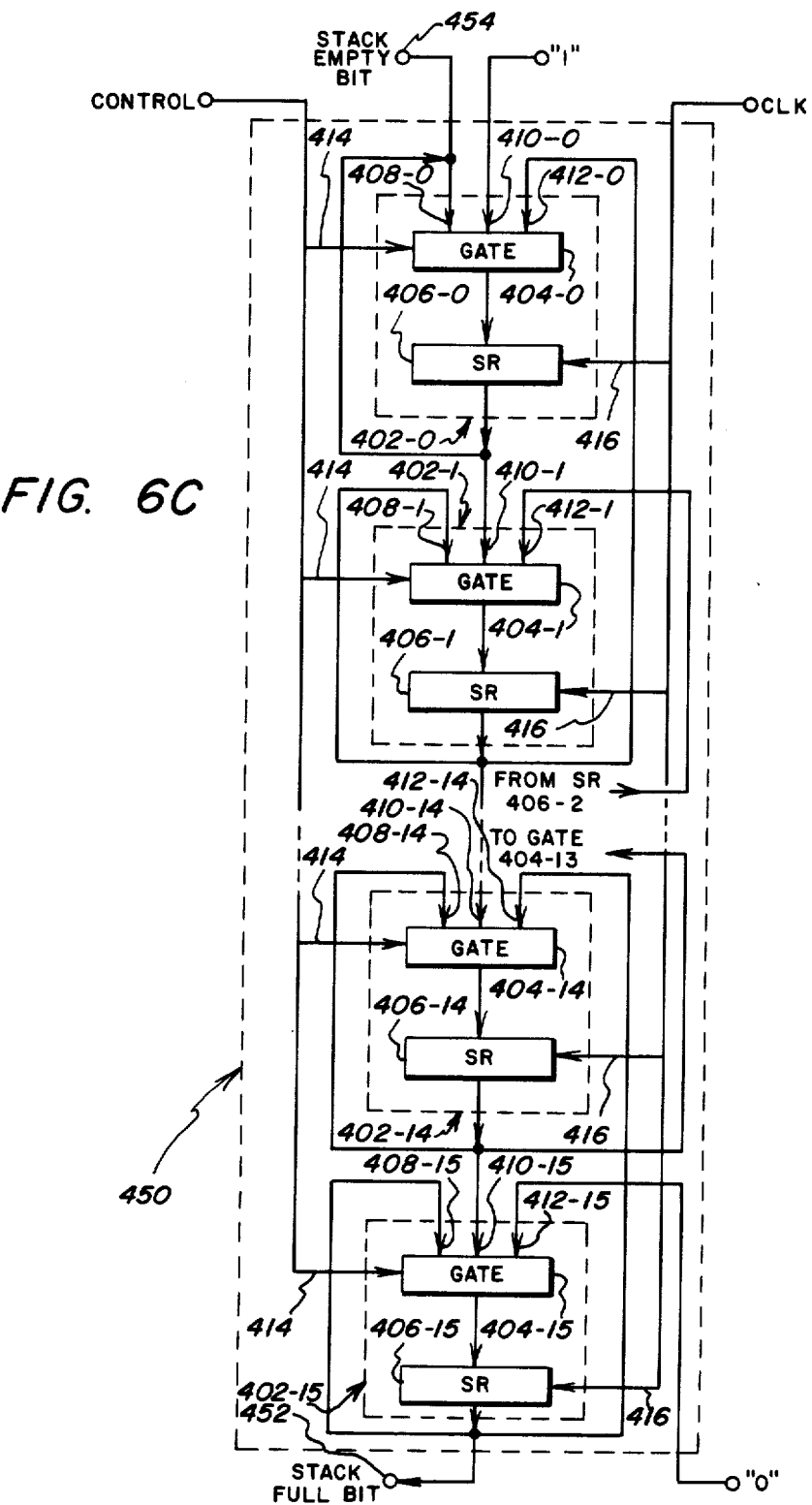

FIG. 6C illustrates an indicator bit position 450 of either stack 224 or 226. Position 450 is substantially identical to position 400 described above and includes positions units 402-0, 402-1..., 402-14 and 402-15, each consisting of a gate 404 and a shift register 406. The various connections to the gates and shift registers are the same as for position 400, the same reference numerals being used in FIG. 6C. Position 450 differs from position 400 only with respect to certain external connections thereto. A logic '1' voltage potential is constantly applied to gate input 410-0 of position 450 rather than connection to the register as for position 400. Gate input 412-15 is connected to a logic '0' voltage potential. The content of shift register 406-15 is available on a stack full terminal 452 and the content of shift register 406-0 is available on a stack empty terminal 454.

Position 450 responds to the "hold" command in the same manner as position 400. Each time the "push-register onto stack" command is applied, the stack shifts down and a logic '1' bit is loaded into shift register 406-0. Each time the "load register from stack" command is applied, the stack shifts up and a logic '0' bit is loaded into shift register 406-15. With logic '1' bits being loaded into the top of the stack and logic '0' bits being loaded into the bottom of the stack, reading a logic '1' on terminal 452 indicates the stack is full, while reading a logic '0' on terminal 454 indicates the stack is empty.

It is noted that setting the indicator bit position to empty, i.e. all '0's loaded in the shift registers of position 450, is effective to reset the entire stack with which that indicator bit position is associated. The shift registers in position 450 are adapted (by means not shown) to be simultaneously set to zero in response to a single "reset stack" control command. It is noted that in applying the above described control commands, one or both registers and/or one or both stacks in apparatus 200 may be reset in a single instruction cycle.

Figure 7:
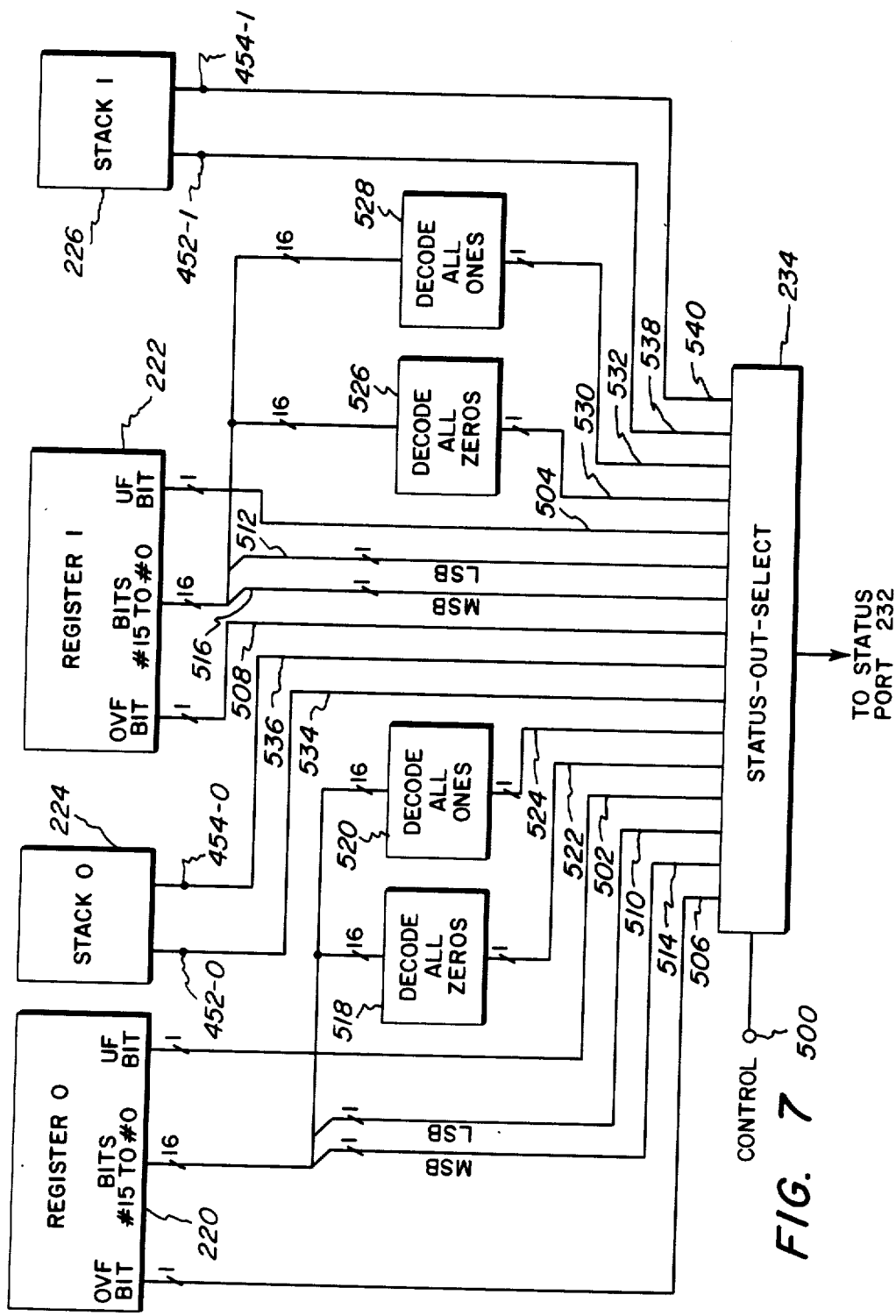
FIG. 7 is an illustrative block diagram of a status-out-select portion of the register-stack apparatus of the present invention.

FIG. 7 illustrates the connections to the status-out-select (S-O-S) device. S-O-S 234 enables the status of various elements of apparatus 200 to be determined and simply comprises a device, such as a multiplexer, for receiving a plurality of status inputs and providing a single one of those inputs on its tri-state output in accordance with a status control signal applied to a control input terminal 500 of the S-O-S. The content of the register 220 and 222 underflow (UF) bit slices are applied to S-O-S inputs 502 and 504, respectively. Similarly, the overflow bit (OVF) slices of registers 220 and 222 are respectively applied to inputs 506 and 508 of the S-O-S. Bits #0, i.e. the LSBs, of registers 220 and 222 are respectively applied to S-O-S inputs 510 and 512, while bits #15, i.e. the MSBs, are respectively applied to inputs 514 and 516.

Bits #15 through #0 of register 220 are applied to two decoders 518 and 520, each having an output applied to S-O-S inputs 522, 524, respectively. Decoder 518 provides a logic '1' on its output only when all of bits #15 through #0 are '0'. Decoder 520 provides a logic '1' output only when all of the register 220 bits applied thereto are '1'. Two decoders 526 and 528 are connected to receive bits #15 through #0 of register 222, each having an output connected to S-O-S inputs 530 and 532, respectively. Decoders 526 and 528 perform the same functions as decoders 518 and 520 respectively. The full/empty status of stacks 224 and 226 are also applied to S-O-S 234. The two stacks are diagrammatically shown in FIG. 7 with the stack full and stack empty terminals respectively designated 452-0 and 454-0 for stack 224 and 452-1 and 454-1 for stack 226. Terminals 452-0, 454-0, 452-1 and 454-1 are respectively applied to S-O-S inputs 534, 536, 538 and 540.

Thus, depending on the status determination being made, the bit appearing on status port 232 can indicate the value of the underflow or overflow bit in either register, the value of the MSB or LSB in either register, whether either register contains all '0' bits or all '1' bits, or the full/empty status of either stack.

With respect to the control of the devices comprising controller 56, the control ports of the I/O device, program counter and register files are each coupled to control bus 66 by a dedicated connection, i.e. a different portion of the control bus is dedicated to each of these controller devices. Each microcode instruction read from program memory 76 and applied to the control bus includes a plurality of control fields respectively dedicated to these different controller devices. For example, and without limitation, assuming a controller with four register files 100, if a 24-bit control field is required to control operation of the register-stack apparatus of the present invention, then a total of six 24-bit control fields (=114 bits) in the microcode instruction are required for control of the I/O device, program counter and four register files. Of course, the microcode instruction would include as many additional fields as necessary to control operation of interface 112 and computing device 54. Control bus 66 is required, as discussed above, to have a bit width sufficient to carry the complete microcode instruction. Within each device 58, 86, 100, control logic 236 receives the control field dedicated to the particular device, decodes it and provides the internal control signals effective to control the device internal components (e.g. R-I-S, register, port-out-select, etc.) in the manner described above.

In operation, the register-stack apparatus of the present invention can be implemented to perform any one of a plurality of different functions. In particular and as discussed with respect to controller 50 (FIG. 1), the register-stack apparatus can be implemented as an I/O device, a program counter or a register file device.

As described above, the controller receives macro-instructions from the host computer bus at a low rate, and provides microcode instructions to the attached device at a high rate. Each macro-instruction serves as an address pointer to one microcode instruction stored in program memory 76. Each such microcode instruction is preferably the first in a sequence of instructions, where each microcode instruction enables, e.g. by incrementing the program counter, the next instruction to be executed. Since, in the illustrated embodiment, the macro-instruction is 16 bits wide, it can point to any of $2^{16}$(=64K) different program memory addresses in which microcode instructions are stored. Note further that each microcode instruction has a bit width substantially wider than each macro-instruction. As a result, the controller operates to "expand" a single macro-instruction into a plurality of microcode instructions each having a bit width substantially greater than the macro-instruction.

As I/O device 58 connected as shown in FIG. 1, the register-stack apparatus operates to receive macro-instructions from the host computer bus, in the form of 16-bit words, and transfers them to control bus 66. The microcode instructions being retrieved from the program memory and executed by the controller (and attached device) include commands, as appropriate, to obtain the next macro-instruction. Specifically, by use of the commands for loading a register from any one of the register-stack data ports, a macro-instruction on host bus 52 can be loaded into either register 0 or register 1 of I/O device 58 via its data port 68. Information so loaded into either register can be read onto either control bus 66 or data bus 64 by applying a control signal to port-out-select 238 (FIG. 2), of the I/O device, effective to read the contents of the desired register respectively onto data port 72 or 70. The macro-instructions so available on either bus can be loaded into either register of the program counter for storage and later application to address port 82 of the program memory. As previously discussed, it may be necessary to load microcode instructions, into program memory, each such instruction being loaded in 16-bit word portions. The 16-bit word portions are transferred from the host bus to the control bus, via I/O device 58 in the manner described above. Appropriate memory addresses are applied to memory address port 82 by the program counter to complete the loading process. The operation of program counter 86 which provides the appropriate memory addresses is described more fully below.

The "push register onto stack" command enables a plurality of 16-bit words received from the host bus to be stored on either or both stacks of the I/O device. These words can later be transferred to either control bus 66 or data bus 64 by applying the "load register from stack" command (i.e. pop) to I/O device 58 and then transferring the register content to the appropriate bus, as discussed above.

In an output mode, the I/O device can transfer data on either buses 64 or 66 to host bus 52. In this manner, the content of program memory 76, the program counter 86 or any register file 100 can be read on the host bus. This is accomplished by commanding the desired one of these devices to read the data to be transferred onto buses 64 or 66. A command to load register 0 or 1 of the I/O device from its data port 70 or 72, as appropriate, results in loading of the transferred data. Then, a command is applied to the port-out-select (FIG. 2) to read the content of the appropriate register onto data port 68 which is, in turn, connected to host bus 52 to complete the data transfer.

As program counter 86 connected as shown in FIG. 1, the register-stack apparatus of the present invention provides a sequence of memory addresses for application to the program memory address port. An initial memory address can be loaded into register 0 from either control bus 66 or data bus 64, each of which is connected to one of the data ports of the counter, by the previously described command for loading a register from a data port. Then, the "count up" command is repetitively applied to cause incrementing of the address stored in the register. Upon each increment, the content of register 0 is read onto data port 84, by the port-out-select device, for application to the program memory address port.

Upon occurrence of a CALL or INTERRUPT, a "push register+1 onto stack" command applied to the program counter results in the next program address in the sequence (=program counter+1) being stored or "pushed" onto stack 0 in one instruction cycle. The CALL or INTERRUPT typically includes a new address for the program to branch to, the new address being loaded into register 0 of the program counter from either bus 64 or 66. Where the source of the CALL or INTERRUPT is the host bus, the new address can be provided to buses 64 or 66 for loading into the program counter. The sequence of microcode instructions initiated by the new address provides the appropriate "count up" commands for application to the program counter to enable sequencing through the portion of microcode instructions to which the branch occurred. Completing execution of this microcode instruction portion is typically followed by a RETURN instruction, e.g. included in the microcode instruction portion, requiring return to the address "program counter+1" that was about to be executed before occurrence of the CALL or INTERRUPT. This address is simply recovered from stack 0, onto which it was previously pushed, by the "load from stack" command. Note that additional CALLs and INTERRUPTs can be nested since each results in the value "program counter+1" being pushed onto stack 0. Then, as each program portion, executed as a result of the CALL or INTERRUPT, is completed, the next address of the interrupted program portion can be popped from the stack.

As each register file 100 connected as shown in FIG. 1, the register-stack apparatus of the present invention is accessible, via buses 60, 62 and 64, to serve as a data storage device for calculations performed in generating microcode for computing device 54. As discussed above, calculations may be performed by interface 112 to generate the microcode being applied to computing device 54. Register files 100 can therefore provide data storage as needed by the interface in performing such calculations. Thus, the register files hold interim calculation results in the process of providing microcode to the attached computing device. Upon execution of a CALL or INTERRUPT, a single "push register onto stack" command simultaneously applied to all register files is effective to store the interim calculation results, or system state, in a single instruction cycle. Upon execution of a RETURN command, a "load from stack" command applied to each register file is effective to recall all of the interim calculation results in a single instruction cycle.

Thus as described above, the register-stack apparatus of the present invention enables construction of a controller which requires a minimum number of instruction cycles in which to operate on CALLs, INTERRUPTs and RETURNs. This serves to minimize the number of no-op instructions provided by the controller to the attached computing device. Hence, the operating efficiency of the computing system is improved. Additional advantages are realized from the fact that the I/O device, program counter and register files are constructed from identical devices. One such advantage derives from the fact that all such devices respond to commands of identical form. It is a simple matter to include in a single microcode instruction, the same or different commands to different ones of these devices. For example, in response to a CALL or INTERRUPT, the "push register onto stack" and "push register+1 onto stack" commands are respectively applied to the register files and the program counter in the same instruction cycle. A second advantage is found in the economy of procuring a plurality of identical components to serve diverse functions in the controller rather than a plurality of diverse components to serve such functions. A third advantage resides in the relative simplicity in achieving device compatibility and programming controller operation where devices performing diverse functions are constructed identically to one another.

Controller 56 has been configured to illustrate the operation of the register-stack apparatus of the present invention. Such a controller could be configured significantly differently from that illustrated in FIG. 1, yet would still require the basic functions performed by the register-stack apparatus. Thus, the register-stack apparatus is not limited in its implementation to the configuration of controller 56.

While the register-stack apparatus of the present invention has been illustrated as implemented in a controller, the invention is not so limited. CALLs, INTERRUPTs and RETURNs are commonly used in other forms of computing systems wherein a significant number of instruction cycles are expended storing program counter values and system state. The present invention can be implemented in such systems and the same advantages realized from its operation, as described above.

The register-stack apparatus of the present invention has been described and illustrated as having two registers and stacks. The invention is, however, not so limited. Each register-stack apparatus can be constructed to include only one or more than two sets of registers, stacks, modifiers, and R-I-Ss. In such a case, the port-out-select and status-out-select would require modification to receive the revised number of register outputs. Additionally, control logic 236 would require modification to receive control signals having a format appropriate to the device configuration.

Particular configurations of logic elements and devices are used in constructing the register-stack apparatus of the present invention, as illustrated hereinabove. The invention is, however, not so limited. It will be obvious to one skilled in the art that the same functions can be achieved by the use of different logic element configurations and devices. For example, though each register and stack comprises a plurality of D-flip flops, numerous other bistable devices, well known in the art, can be as readily implemented. Further where such different element configurations and devices are implemented, it is equally within the skill of the art to approximately modify their control inputs in accordance with their respective requirements.

The computing system disclosed herein has been described as including an attached computing device such as a parallel processor array or a special purpose processor. Such attached devices are exemplary only, there being other types of attached devices, known in the art, requiring coupling to a host computer via a controller.

While the register, stack memory and internal data buses of the present invention have been described as having particular bit capacities, the present invention is not so limited. The register-stack apparatus may be constructed with different bit capacities to meet the requirements of the computing system in which it is being implemented.

The devices as illustrated herein includes terminals both for receiving and providing signals. Such terminals are included herein merely to facilitate description of the present invention's operations. In practice, the register-stack apparatus disclosed herein may be integrated onto a circuit chip including other devices which, while not pertinent to the practice of the present invention, are nonetheless necessary components. In such a case, the devices illustrated herein may be either directly connected to other devices on the chip or to input/output terminals of the chip.

While a preferred embodiment has been illustrated and described herein, it will be obvious that numerous modifications, changes, variations, substitutions and equivalents, in whole or in part, will occur to those skilled in the art without departing from the spirit and scope contemplated by the invention. Accordingly, it is intended that the invention herein be limited only by the scope of the appended claims.

What is claimed is:

1. Apparatus, comprising:
    first memory means for retrievably storing a plurality of binary bit signals;
    second memory means for retrievably storing a plurality of binary bit signals such that a last signal stored therein is a first available signal for retrieval, said second memory means being coupled to receive for storage a content of said first memory means;
    modifier means for providing the contents of said first memory means in a plurality of predetermined modified forms on a like plurality of modifier means outputs;
    select means, responsive to an applied one of a plurality of possible control command signals, for applying to said first memory means selected binary bit signals for storage therein, said select means being coupled to receive said plurality of predetermined modified forms of said first memory means contents; and
    output means for applying the contents of said first memory means to one of a plurality of ports for reading said first memory means contents external to said apparatus.

2. The apparatus of claim 1 wherein said first memory means comprises a register; and
    said second memory means comprising a stack memory.

3. The apparatus of claim 2 wherein said register is eighteen bit positions wide inclusive of an overflow and an underflow bit position; and
    said stack memory having a width of nineteen bit positions and a depth of sixteen words.

4. The apparatus of claim 3 wherein eighteen bit positions of the nineteen bit position width of said stack memory correspond to the bit positions of said register; and
    a nineteenth bit position of said stack memory providing an indication of a full/empty status of said stack memory.

5. The apparatus of claim 2, said modifier means including:
    means for adding a binary '2' bit to the contents of said register;
    means for subtracting a binary '1' bit from the contents of said register;
    means for providing a complement of the contents of said register; and
    means for providing in an unmodified form the contents of said register.

6. The apparatus of claim 5 wherein said ports are adapted to receive binary bit signals generated externally to said apparatus for storage in said register;
    said select means further coupled to receive:
    externally generated binary bit signals applied to said ports; and
    the signal last stored in said stack memory; said select means further including:
    means, responsive to said control command, for left shifting the contents of said register by one bit position; and
    means, responsive to said control command, for right shifting the contents of said register by one bit position.

7. The apparatus of claim 6 wherein said register is eighteen bit positions wide inclusive of an overflow and an underflow bit position.

8. The apparatus of claim 7 wherein said stack memory has a width of nineteen bit positions and a depth of sixteen words.

9. The apparatus of claim 8 wherein eighteen bit positions of the nineteen bit position width of said stack memory correspond to the bit positions of said register; and
    the nineteenth bit position of said stack memory providing an indication of a full/empty status of said stack memory.

10. The apparatus of claim 8 further including status means, responsive to an externally generated status control signal, for providing an indication of the contents of said register and said stack memory;
    said status means adapted to indicate:
    a content of said overflow bit position;
    a content of said underflow bit position;
    a condition that the contents of all bit positions in said register exclusive of said overflow and underflow bit positions are binary '1' bits;
    a condition that the contents of all bit positions in said register exclusive of said overflow and underflow bit positions are binary '0' bits; and
    a full/empty status of said stack memory.

11. The apparatus of claim 6 and further comprising:
    first and second ones of said register;
    first and second ones of said stack memory;
    first and second ones of said modifier means;
    first and second ones of said select means;
    said first and second stack memory respectively coupled to receive for storage the content of said first and second registers;
    said first and second modifier means adapted to provide in said predetermined modified forms the contents of said first and second registers, respectively; and
    said first and second select means adapted to apply said selected binary bits to said first and second registers, respectively.

12. The apparatus of claim 11 wherein said first and second registers are eighteen bit positions wide inclusive of an overflow and an underflow bit position; and
    said first and second stack memories each having a width of nineteen bit positions and a depth of sixteen words.

13. The apparatus of claim 12 further including status means for providing an indication of the contents of said first and second registers and said first and second stack memories in accordance with an externally generated status control signal;
    said status means adapted to indicate:
    a content of said overflow bit position;
    a content of said underflow bit position;
    a condition that the contents of all bit positions in said first or said second register exclusive of said overflow and underflow bit positions are binary '1' bits;
    a condition that the contents of all bit positions in said first or said second register exclusive of said overflow and underflow bit positions are binary '0' bits; and
a full/empty status of said first or said second stack memory.

14. Apparatus, comprising:
a first register for storing bianary bit signals;
a second register identical to said first register, said first and second registers each being eighteen bit positions wide inclusive of an overflow and an underflow bit position;
a first stack memory for storing binary bit signals such that a last signal stored therein is a first available for retrieval;
a second stack memory identical to said first stack memory, said first and second stack memories being coupled to receive for storage a content of said first and second registers, respectively;
first modifier means for providing in a plurality of predetermined modified forms the contents of said first register on a like plurality of first modifier means outputs;
second modifier means, identical to said first modifier means, for providing in the plurality of predetermined modified forms the contents of said second register on the like plurality of second modifier means outputs;
said first and second modifier means each including:
  means for adding a binary '1' bit to the contents of its respective register;
  means for subtracting a binary '1' bit from its respective register;
  means for providing a complement of the contents of its respective register; and
  means for providing in an unmodified form the contents of its respective register;
first select means for applying to said first register for storage therein binary bits selected in accordance with an applied one of a plurality of possible control command signals;
second select means for applying to said second register for storage therein binary bits selected in accordance with the control command signal, said second select means being identical to said first select means;
output means, responsive to the control command signal, for selectively applying the contents of said first or second registers to one of three data ports for reading external to said apparatus;
said data ports adapted to receive binary bit signals generated external to said apparatus for storage in said first or second registers; p1 said first and second select means coupled to receive:
  said predetermined modified forms provided by said first and second modifier means, respectively;
  externally generated binary bit signals on said data ports; and
  the signal last stored in said first and second stack memories, respectively;
said first and second select means respectively further including:
  means, responsive to the control command signal, for respectively left shifting the contents of said first and second registers by one bit position;
  means, responsive to the control command signal, for respectively right shifting the contents of said first and second registers by one bit position;
  means, responsive to the control command signal, for respectively loading '1' bits into said first and second registers; and
  means, responsive to the control command signal, for respectively loading '0' bits into said first and second registers; status means for providing an indication of the contents of said first and second registers and said first and second stack memories in accordance with an externally generated status control signal; and
said status means adapted to indicate with respect to either said first or said second register:
  a content of said overflow bit position;
  a content of said underflow bit position;
  a condition that the contents of all bit positions, exclusive of said overflow and underflow bit positions, are binary '1' bits;
  a condition that the contents of all bit positions, exclusive of said overflow and underflow bit positions, are binary '0' bits; and said status means being further adapted to indicate a full/empty status of said first or said second stack memory.

15. A computing system, comprising:
a host bus on which to transmit binary signals to and receive binary signals from a host computer;
an attached computing device;
controller means for receiving macro-instructions from said host bus and expanding the macro-instructions into microcode instructions for application to said attached computing device;
said controller including:
  a data bus;
  a control bus;
  an input/output (I/O) device for transferring binary signals between said host bus and said data and control busses;
  a program memory for storing microcode instructions for said attached computing device;
  a program counter for providing a sequence of memory addresses for application to an address port of said program memory, said program counter being coupled to said data and control busses;
  means, coupled to said data and control busses, for interfacing with said attached computing device; and
  a register file device for providing retrievable memory storage, said register file device being coupled to said controller data bus for access by said program counter, said I/O device and said interface means;
said program counter and said register file device being identical to one another and each constructed from a separate register-stack apparatus, said register-stack apparatus comprising:
  first memory means for retrievably storing a plurality of binary bit signals;
  second memory means for retrievably storing a plurality of binary bit signals such that a signal last stored therein is a first available for retrieval, said second memory means being coupled to receive for storage a content of said first memory means;
  modifier means for providing the contents of said first memory means in a plurality of predetermined modified forms on a like plurality of modifier means outputs;

select means, responsive to an applied one of a plurality of possible control command signals, for applying to said first memory means selected binary bit signals for storage therein, said select means being coupled to receive said plurality of predetermined modified forms of said first memory means contents; and output means for applying the contents of said first memory means to one of a plurality of data ports for reading said first memory means contents external to said register-stack apparatus.

16. The computing system of claim 15 wherein said I/O device is also constructed from said register-stack apparatus.

17. The computing system of claim 15 wherein said first memory means of said register-stack apparatus comprises a register; and said second memory means comprising a stack memory.

18. The computing system of claim 17, said modifier means of said register-stack apparatus including:

means for adding a binary '1' bit to the contents of said register;

means for subtracting a binary '1' bit from the contents of said register;

means for providing a complement of the contents of said register; and means for providing in an unmodified form the contents of said register.

19. The computing system of claim 18 wherein said data ports of said register-stack apparatus are adapted to receive binary bit signals generated externally thereto for storage in said register;

said select means of said register-stack apparatus further coupled to receive:

externally generated binary bit signals on said ports; and the signal last stored in said stack memory;

said select means of said register-stack apparatus further including:

means, responsive to said control command signal, for left shifting the contents of said register by one bit position;

means, responsive to said control command signal, for right shifting the contents of said register by one bit position;

means, responsive to said control command signal, for respectively loading '1' bits into said register; and means, responsive to said control command signal, for respectively loading '0' bits into said register.

20. The computing system of claim 19 wherein said register of said register-stack apparatus is eighteen bit positions wide inclusive of an overflow and an underflow bit position; and said stack memory having a width of nineteen bit positions and a depth of sixteen words.

21. The computing system of claim 20 wherein eighteen bit positions of the nineteen bit position width of said stack memory correspond to the bit positions of said register; and the nineteenth bit position of said stack memory providing an indication of a full/empty status of said stack memory.

22. The computing system of claim 20, said register-stack apparatus further including status means, responsive to an externally generated status control signal, for providing an indication of the contents of said register and said stack memory;

said status means adapted to indicate:

a content of said overflow bit position;

a content of said underflow bit position;

a condition that the contents of all bit positions in said register exclusive of said overflow and underflow bit positions are binary '1' bits;

a condition that the contents of all bit positions in said register exclusive of said overflow and underflow bit positions are binary '0' bits; and a full/empty status of said stack memory.

23. The computing system of claim 19, said register-stack apparatus further comprising:

first and second ones of said register;

first and second ones of said stack memory;

first and second ones of said modifier means;

first and second ones of said select means;

said first and second stack memories respectively coupled to receive for storage the contents of said first and second registers;

said first and second modifier means adapted to provide in said predetermined modified forms the contents of said first and second registers, respectively; and said first and second select means adapted to apply said selected binary bits to said first and second registers, respectively.

* * * * *